(12) United States Patent
Theobold

(10) Patent No.: US 7,565,169 B1
(45) Date of Patent: Jul. 21, 2009

(54) ACCESS POINT WITH ORIENTATION SENSOR

(75) Inventor: David M. Theobold, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 793 days.

(21) Appl. No.: 10/315,410

(22) Filed: Dec. 10, 2002

(51) Int. Cl.
*H04M 1/00* (2006.01)

(52) U.S. Cl. .................. 455/561; 455/404.2; 455/446; 455/456.1; 342/147

(58) Field of Classification Search .............. 455/25, 455/414.2, 63.4, 445, 16, 562.1, 446, 561, 455/404.2, 456.1; 342/357.11, 359, 417, 342/147
See application file for complete search history.

(56) References Cited

U.S. PATENT DOCUMENTS

| | | | | |
|---|---|---|---|---|
| 4,945,347 A | * | 7/1990 | Perry | 340/689 |
| 6,330,459 B1 | * | 12/2001 | Crichton et al. | 455/562.1 |
| 6,381,055 B1 | * | 4/2002 | Javitt et al. | 398/131 |
| 6,445,688 B1 | * | 9/2002 | Garces et al. | 370/334 |
| 6,738,614 B1 | * | 5/2004 | Blankenship et al. | 455/414.4 |
| 6,816,706 B1 | * | 11/2004 | Hohnstein et al. | 455/25 |
| 6,850,766 B2 | * | 2/2005 | Lau et al. | 455/456.1 |
| 6,873,851 B2 | * | 3/2005 | Brown et al. | 455/456.3 |
| 6,879,838 B2 | * | 4/2005 | Rankin et al. | 455/456.6 |
| 2001/0041565 A1 | * | 11/2001 | Vicharelli et al. | 455/423 |

FOREIGN PATENT DOCUMENTS

JP  07146995 A  *  6/1995

* cited by examiner

*Primary Examiner*—Raymond S Dean
(74) *Attorney, Agent, or Firm*—Tucker Ellis & West LLP

(57) ABSTRACT

A wireless access point and method of deploying is disclosed including a radio component for wirelessly communicating with at least one mobile client and a connection from the access point to a network. A directional orientation component is provided for obtaining the directional orientation of the access point with respect to a predetermined coordinate system. The predetermined coordinate system can be a local coordinate system of a predetermined bounded area or with respect to the directional vectors relative to Earth's coordinate system.

11 Claims, 1 Drawing Sheet

ACCESS POINT WITH ORIENTATION SENSOR

BACKGROUND OF THE INVENTION

Wireless access points (APs) have been used with wireless local area networks (WLANs) to exchange communication signals with wireless mobile and fixed clients. Such wireless APs are typically comprised of single or dual frequency band radios having separate or shared omnidirectional or low gain (typically, less than 10 dBi) directional antennas. The location, frequency band assignment, and antenna characteristics of such APs are of interest to the network management function insofar that they affect network coverage. However, the AP orientation is of little interest other than to know how to use a low gain directional antenna (such as when an AP is located on a wall or on a high ceiling).

However, it is expected that the next generation of APs will use multiple antennas for sector coverage and/or array antennas for beam forming coverage using multiple simultaneous frequency bands. The network management function for such multichannel APs or adaptive array APs therefore becomes considerably more complex. At issue is the fact that in addition to location, the orientation of the AP must be known in order to ascertain in which direction particular antenna beams will provide coverage.

Additionally, AP orientation knowledge is required if "location based services" are to be incorporated into a wireless network system. Location based services enable the detection of the position in space of a client device or other type of device seeking access to the network. Types of location based services may include client identification and location, rogue client identification and location, equipment location, perimeter security, and a host of other functions. These functions require knowledge of the physical position of the AP, as well as orientation of the AP with respect to three-dimensional space.

In a typical AP installation, the orientation of the AP could be noted by the installer at the time of deployment, who would then forward that information to the network administrator. However, such a manual process is prone to error since the function might contain observational or notational error. This could lead to erroneous results in the implementation of the location based services.

SUMMARY OF THE INVENTION

In view of the difficulties and drawbacks encountered with previous-type AP implementations, a method and apparatus of automatically determining AP orientation and forwarding it to the network administration function is contemplated. The invention includes a wireless access point and method of deploying a radio component for wirelessly communicating with at least one mobile client and a connection from the access point to a network. A directional orientation component is provided for obtaining the directional orientation of the access point with respect to a predetermined coordinate system. The predetermined coordinate system can be a local coordinate system of a predetermined bounded area or with respect to the directional cardinal points of Earth's coordinate system.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE INVENTION

Figure 1:
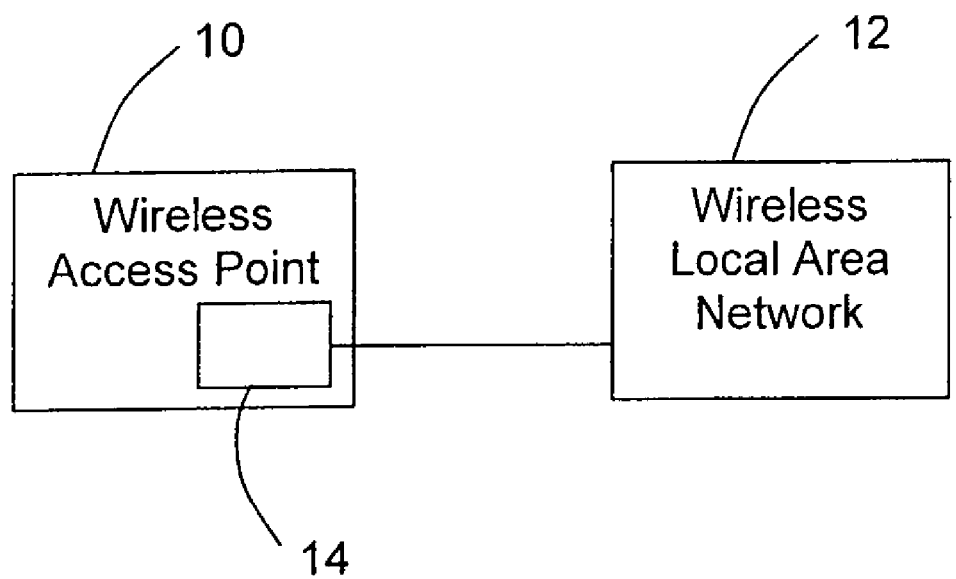
FIG. 1 is a block diagram depicting a wireless access point including a directional orientation component, in accordance with the present invention.

FIG. 1 is a block diagram depicting a wireless access point 10 connected to a WLAN 12 is accordance with a preferred embodiment of the present invention. The connection between the AP 10 and the WLAN 12 can be a hardwired connection or a wireless connection such as would typically be deployed. The AP 10 includes a directional orientation component 14 for obtaining the directional orientation of the AP 10. The directional orientation component 14 can be used to determine the orientation of the AP 10 with respect to the magnetic "compass points," i.e. the relative directional cardinal points of the Earth's coordinate system, and optionally the local measure of elevation angle relative to the horizon. The directional orientation component 14 can also be used to reference the AP 10 with respect to any local coordinate system, e.g. the floor plan of a building or other predetermined bounded area. In the preferred embodiment, the directional orientation component 14 can initially determine the orientation of the AP 10 at the time of deployment and specifically the orientation of the AP 10 relative to other APs in the WLAN 12 system. A measure of elevation angle relative to the horizon of the AP 10 can optionally be used to ascertain the physical orientation of the AP housing, which measure is useful in ascertaining the orientation of the complement of antennas on the housing. The component 14 can optionally be used to periodically confirm the orientation of the AP 10, in the event that the AP 10 might be moved or disturbed in an enterprise rollout.

In the preferred embodiment, the directional orientation component 14 can be a magnetic sensor located within the AP 10 and optionally a one or two-axis elevation sensor. A reference point is noted within the AP housing so that the radio/antenna pairs within the AP 10 might be indexed. A two or three-axis magnetic sensor is preferably incorporated to measure the magnetic field of the Earth relative to that reference point. In order to obtain a more precise directional resolution, the magnetic declination of the deployment location may be calculated in order to calibrate the magnetic sensor. In this way, a very sensitive and precise measurement of the directional orientation of the AP 10 may be obtained. Optionally, one or two elevation angle (gravitational) sensors may be used to provide a local measure of elevation angle in one or two axes relative to the horizon.

A variety of implementations could be employed as a directional orientation component 14, and would provide a number of respective advantages and engineering tradeoffs. Such implementations would include but not be limited to: position sensing magnetic floats; Hall-effect devices; flux-gate magnetometers; dielectric fluid clinometers; and pendulum sensors. Any suitable measurement circuitry, either digital or analog, could be used to process the orientation information. For example, the sensor measurement could be processed as a subroutine in the AP 10 to be read as any other status command to provide the orientation information. Alternatively, the sensor measurement could be forwarded to a remote server or other component on the network 12. In either case, the orientation information could be maintained in a central database for maintaining the directional orientations of all the APs associated with the WLAN 12.

As disclosed in the above embodiment, potential measurement errors may include a measurement error in the sensor itself. In addition, residual errors may occur in magnetic declination, periodic variations in geomagnetic activity, and known secular variations in geomagnetism. In addition, errors may result from the effect of nearby ferromagnetic materials and/or electrical fluxes. Thus, the directional orientation component 14 of the present invention may also include a component for determining directional orientation from radio sources, including ground-based signals or satellite signals such as GPS (i.e. global positioning system) and similar. Such radio signals could be measured by using an existing antenna of the AP 10. In addition, a separate dedicated antenna may be incorporated in the directional orientation component 14. In any case, the present directional orientation component 14 provides relative orientation information for multiple channel APs or adaptive array APs incorporated into a network.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

What is claimed is:

1. A wireless access point comprising:
   a housing;
   a reference point within the housing;
   a radio component for wirelessly communicating with at least one mobile client;
   a connection from the access point to a network; and
   a directional orientation component comprising a magnetic sensor within the housing operable to measure a magnetic field of the Earth relative to the reference point to determine a directional orientation of said access point with respect to the magnetic field of the Earth.

2. The wireless access point of claim 1 wherein the magnetic sensor comprises a two-axis magnetic sensor for determining a direction upon earth's surface aligned with earth's magnetic field.

3. The wireless access point of claim 2 wherein the magnetic sensor comprises an arrangement for calculating the magnetic declination.

4. The wireless access point of claim 1 wherein the magnetic sensor is selected from the group consisting of a magnetic position sensing float, a Hall-effect device, and a flux-gate magnetometer.

5. The wireless access point of claim 1 wherein the directional orientation component comprises a measurement circuit for processing the orientation information.

6. The wireless access point of claim 1 wherein the directional orientation component forwards an orientation measurement to a remote network component via the connection for processing the orientation information.

7. The wireless access point of claim 6 wherein the directional orientation is maintained in a central database for maintaining the directional orientations of a plurality of wireless access points associated with the network.

8. A wireless access point according to claim 1, the directional orientation component further comprises an elevation sensor to measure an elevation angle to a horizon.

9. A wireless access point according to claim 8,
   wherein the elevation sensor comprises a gravitational sensor to ascertain the physical orientation relative to the reference point within the housing.

10. A wireless access point according to claim 1, the directional orientation component further comprises a pendulum sensor.

11. A wireless access point according to claim 1, further comprising:
   an antenna coupled to the radio component;
   wherein the directional orientation component determines the specific direction the access point is pointed towards to ascertain in which direction the antenna will provide coverage.

* * * * *